US009210673B2

(12) United States Patent
Li et al.

(10) Patent No.: US 9,210,673 B2
(45) Date of Patent: Dec. 8, 2015

(54) RECOVERY FROM UPLINK TIMING ALIGNMENT FAILURES IN CELLULAR COMMUNICATIONS

(71) Applicant: Apple Inc., Cupertino, CA (US)

(72) Inventors: Si Li, Santa Clara, CA (US); Giri Prassad Deivasigamani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 13/738,083

(22) Filed: Jan. 10, 2013

(65) Prior Publication Data

US 2014/0064195 A1  Mar. 6, 2014

Related U.S. Application Data

(60) Provisional application No. 61/697,579, filed on Sep. 6, 2012.

(51) Int. Cl.
| | |
|---|---|
| *H04W 4/00* | (2009.01) |
| *H04W 56/00* | (2009.01) |
| *H04W 74/08* | (2009.01) |
| *H04W 36/08* | (2009.01) |
| *H04W 74/02* | (2009.01) |
| *H04W 74/04* | (2009.01) |

(52) U.S. Cl.
CPC .............. *H04W 56/00* (2013.01); *H04W 74/08* (2013.01); *H04W 36/08* (2013.01); *H04W 74/02* (2013.01); *H04W 74/04* (2013.01)

(58) Field of Classification Search
CPC ... H04W 56/00; H04W 76/027; H04W 88/06; H04W 76/066; H04W 74/00; H04W 74/004; H04W 74/008; H04W 74/0891; H04W 74/0883
USPC ......... 370/324, 328, 329, 331, 332, 333, 350; 455/434, 515
See application file for complete search history.

(56) References Cited

U.S. PATENT DOCUMENTS

| | | | | |
|---|---|---|---|---|
| 6,282,419 | B1 * | 8/2001 | Findikli | 455/434 |
| 6,400,695 | B1 * | 6/2002 | Chuah et al. | 370/310 |
| 6,996,372 | B2 * | 2/2006 | Noerpel et al. | 455/67.11 |
| 7,515,559 | B2 * | 4/2009 | Koo et al. | 370/328 |
| 7,593,372 | B2 * | 9/2009 | Khoo et al. | 370/336 |
| 8,009,663 | B2 * | 8/2011 | Yamada et al. | 370/350 |
| 8,050,226 | B2 * | 11/2011 | Park et al. | 370/329 |
| 8,064,383 | B2 * | 11/2011 | Koo et al. | 370/328 |
| 8,089,921 | B2 * | 1/2012 | Yamada et al. | 370/328 |
| 8,208,416 | B2 * | 6/2012 | Suzuki et al. | 370/310 |

(Continued)

*Primary Examiner* — Brian O'Conner
(74) *Attorney, Agent, or Firm* — Meyertons, Hood, Kivlin, Kowert & Goetzel, P.C.; Jeffrey C. Hood; Joel L. Stevens

(57) ABSTRACT

Regaining uplink synchronization after timing alignment failure in cellular communications. An out-of-sync condition with a cellular network may be detected. A first type of random access procedure may be initiated in response to detecting the out-of-sync condition. It may be determined whether or not a message transmitted as part of the first type of random access procedure is received by the cellular network. If the message transmitted as part of the first type of RACH is received by the network and no response to the message is received from the cellular network, a second type of RACH may be initiated. The second type of RACH may include a message having an indication that an out-of-sync condition occurred.

25 Claims, 5 Drawing Sheets

(56) References Cited

U.S. PATENT DOCUMENTS

| | | | | |
|---|---|---|---|---|
| 8,218,488 B2* | 7/2012 | Wager et al. | | 370/329 |
| 8,228,827 B2* | 7/2012 | Jeong et al. | | 370/278 |
| 8,259,659 B2* | 9/2012 | Luft et al. | | 370/329 |
| 8,259,701 B2* | 9/2012 | Futaki et al. | | 370/350 |
| 8,265,034 B2* | 9/2012 | Islam et al. | | 370/331 |
| 8,274,936 B2* | 9/2012 | Yoo | | 370/329 |
| 8,274,969 B2* | 9/2012 | Wu | | 370/354 |
| 8,295,165 B2* | 10/2012 | Jung et al. | | 370/225 |
| 8,588,169 B2* | 11/2013 | Dinan | | 370/329 |
| 8,599,771 B2* | 12/2013 | Gholmieh et al. | | 370/329 |
| 8,625,442 B2* | 1/2014 | Ratasuk et al. | | 370/252 |
| 8,700,029 B2* | 4/2014 | Wu | | 455/425 |
| 8,711,789 B2* | 4/2014 | Ratasuk et al. | | 370/329 |
| 8,737,336 B2* | 5/2014 | Lohr et al. | | 370/329 |
| 8,768,392 B2* | 7/2014 | Ohta et al. | | 455/509 |
| 8,787,956 B2* | 7/2014 | Ohta et al. | | 455/509 |
| 8,885,583 B2* | 11/2014 | Yamada et al. | | 370/329 |
| 8,917,593 B2* | 12/2014 | Damnjanovic et al. | | 370/228 |
| 8,934,354 B2* | 1/2015 | Jeong | | 370/252 |
| 8,989,113 B2* | 3/2015 | Mukherjee et al. | | 370/329 |
| 8,995,372 B2* | 3/2015 | Kwon et al. | | 370/329 |
| 9,094,910 B2* | 7/2015 | Wu | | 1/1 |
| 2011/0021154 A1 | 1/2011 | Marinier et al. | | |
| 2011/0280210 A1 | 11/2011 | Zhang et al. | | |
| 2012/0250498 A1 | 10/2012 | Johansson et al. | | |

* cited by examiner

RECOVERY FROM UPLINK TIMING ALIGNMENT FAILURES IN CELLULAR COMMUNICATIONS

PRIORITY CLAIM

The present application claims benefit of priority to U.S. Provisional Application No. 61/697,579 titled "Recovery from Uplink Timing Alignment Failures in Cellular Communications" and filed on Sep. 6, 2012, whose inventors are Si Li and Giri Prassad Deivasigamani, which is hereby incorporated by reference in its entirety as though fully and completely set forth herein.

FIELD

The present application relates to wireless devices, and more particularly to recovery from timing alignment failures in wireless communications.

DESCRIPTION OF THE RELATED ART

Wireless communication systems are rapidly growing in usage. Further, wireless communication technology has evolved from voice-only communications to also include the transmission of data, such as Internet and multimedia content. To accommodate multiple users, many wireless communication utilize multiple access techniques, such as code division multiple access (CDMA), time division multiple access (TDMA), and/or frequency division multiple access (FDMA).

For systems which utilize FDMA techniques for uplink communications, uplink (UL) timing synchronization or alignment may be particularly important in order to avoid interference and attain good system efficiency. For example, to keep UL orthogonality, signals transmitted from different user equipment devices (UEs) within a cell may have to arrive at a base station at around the same time, or else may cause intra-cell interference. To achieve UL transmission timing alignment, a "timing advance" (TA) parameter may be provided to wireless devices from the cellular network which provides those wireless devices with cellular service.

An initial TA may be obtained upon entering a connected-mode with the cellular network. The TA may subsequently be occasionally updated, e.g., to account for movement of the UE and/or other conditions. A timer (which may be referred to as "timeAlignmentTimer") may be utilized to ensure that the TA is updated with at least a minimum frequency; this timer may be restarted or reset by the UE each time a TA update is received. However, particularly when channel conditions are poor (but also possibly at other times/for other reasons), it is possible that the UE will not be able to receive/decode the TA values before the timeAlignmentTimer expires, in which case the UE may lose UL synchronization. In this case, timing synchronization may need to be re-acquired in order to perform further uplink communications.

The UE may be unaware of what state the network is in, but since the UE may still be in the connected-mode, the UE may attempt to utilize a connected-mode procedure to regain timing alignment. However, it is highly possible that network has already released the UE implicitly, which would mean that the connected-mode procedure for regaining timing alignment could not succeed. Thus the connected-mode procedure for regaining timing alignment, as well as any subsequent attempts (re-tries) to perform the connected-mode procedure for regaining timing alignment, would fail, which in turn would result in a radio link failure (RLF).

Furthermore, if access stratum (AS) security is activated before the RLF, the UE may still be in the connected-mode and thus may continue to use connected-mode procedures to re-establish the radio link. In this case, as before, since the network may have released the connection, these further attempts may also fail. Accordingly, improvements in the field, and particularly with respect to re-gaining uplink timing alignment after losing uplink timing synchronization, would be desirable.

SUMMARY

In order to avoid this unnecessary failure of attempts to regain uplink timing alignment and RLF, among other benefits, embodiments are presented herein of a system and method for recovering from uplink (UL) timing assignment failures in cellular communications. In particular, a UE which loses uplink synchronization may take steps to regain synchronization in a manner that attempts to determine and take into consideration the network's state with respect to the UE, in order to recover uplink synchronization in a timely manner.

For example, if the UE loses uplink synchronization (e.g., as a result of expiration of the timeAlignmentTimer), the UE may initially attempt to regain synchronization by way of a connected-mode procedure. If the first connected-mode procedure attempt succeeds, the UE and the network will regain synchronization and data transfer can resume.

If the first (connected-mode) procedure does not succeed, the UE may determine whether or not the failure is a type of failure which would indicate that the network has released its connection with the UE. For example, in LTE, a connected-mode random access procedure (RACH) may include a "Msg3", which may include a type of UE identifier (a "C-RNTI") specific to the connected-mode connection with the network. Thus in this case, the UE might monitor a physical HARQ indicator channel (PHICH) for acknowledgment (ACK) or negative acknowledgement (NACK) indications of whether the Msg3 is received by the network.

If the Msg3 was not received (e.g., no ACK/NACK was received, or a NACK indicating that the network did not successfully receive the Msg3 was received), the UE may back off and restart the connected-mode RACH. If the Msg3 was received, but no response message ("Msg4") is received, there may be a high likelihood that the UE has been released by the network, in which case any further connected-mode RACHs would also be unsuccessful. In this case, the UE may attempt to regain synchronization by way of an idle-mode RACH.

The idle-mode RACH may use a different type of UE identifier (e.g., a "S-TMSI" in LTE) to identify the UE to the network, instead of the (expired/released) C-RNTI. As such, the idle-mode RACH may not experience the same issue that caused failure of the connected-mode RACH. Additionally, it may be desirable for the idle-mode RACH to include an indication that it is being used as a result of an out-of-sync condition, for example by way of a media access control (MAC) field in one of the RACH messages (e.g., the Msg3). This may further assist the UE and the network in regaining uplink synchronization. Accordingly, it is likely that the idle-mode RACH will be successful. However, if the idle-mode RACH does fail, the UE may perform further idle-mode RACH attempts, e.g., until a successful RACH is performed and uplink synchronization is regained, or until or a maximum number of RACH attempts is reached.

Thus, by taking note of conditions which may be indicative of release of the UE by the network (e.g., successful receipt of connected-mode Msg3 by the network but no Msg4 receipt by the UE) and acting accordingly, the UE may potentially more quickly recover from timing alignment failures. In particular, by transitioning to use of an idle-mode RACH to regain synchronization after only one (or few) failed connected-mode RACHs in such situations, the UE may avoid numerous failed connected-mode RACH attempts and a radio link failure which might result therefrom if the UE were to blindly continue re-trying connected-mode RACHs without regard for the state of the network with respect to the UE.

BRIEF DESCRIPTION OF THE DRAWINGS

A better understanding of the present invention can be obtained when the following detailed description of the embodiments is considered in conjunction with the following drawings.

Figure 1:
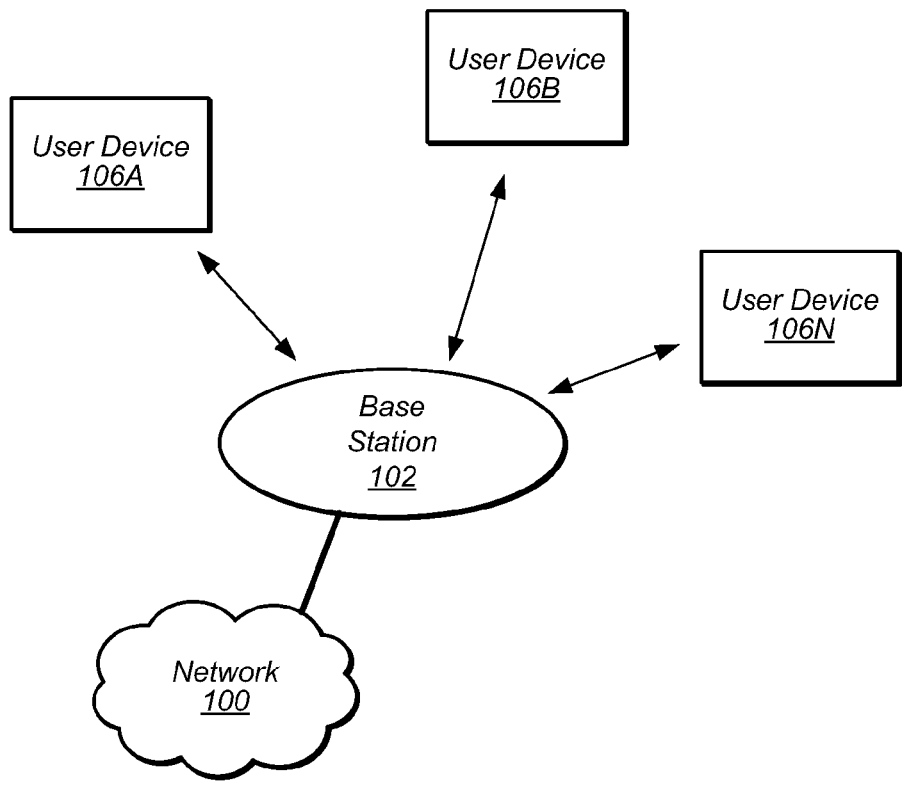
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiitng to the particular form disclosed, but on the contrary, the intention is to cover all modifications, equivalents and alternatives falling within the spirit and scope of the present disclosure as defined by the appended claims.

DETAILED DESCRIPTION

Acronyms

The following acronyms are used in the present disclosure:
LTE: Long Term Evolution
UMTS: Universal Mobile Telecommunication System
GSM: Global System for Mobile communications
OFDM: Orthogonal Frequency Division Multiplexing
UL: Uplink
DL: Downlink
Tx: Transmission or Transmit
Rx: Reception or Receive
RRC: Radio Resource Control
MAC: Media Access Control
RACH: Random Access Procedure
PUCCH: Physical Uplink Control Channel
PUSCH: Physical Uplink Shared Channel
HARQ: Hybrid Automatic Repeat Request
PHICH: Physical HARQ Indicator Channel
RNTI: Radio Network Temporary Identifier
TMSI: Temporary Mobile Subscriber Identity Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer sytsems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
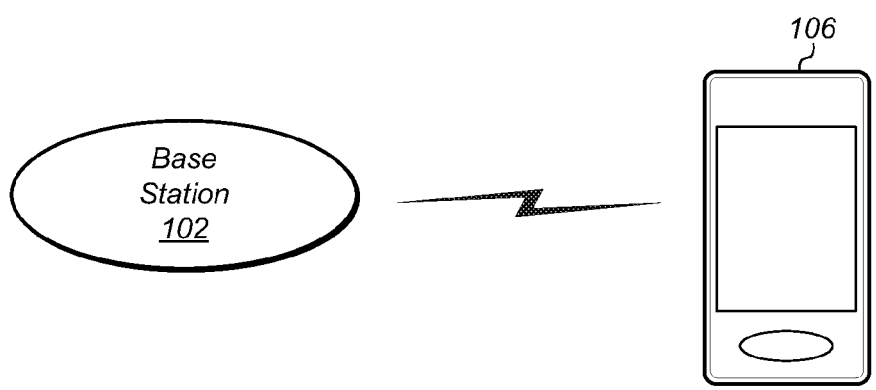
FIG. 2 illustrates a base station 102 in communication with user equipment 106.

FIGS. 1 and 2—Communication System

FIG. 1 illustrates an exemplary (and simplified) wireless communication system. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

A UE 106 may be capable of communicating using multiple wireless communication standards. For example, a UE 106 might be configured to communicate using two or more of GSM, UMTS, CDMA2000, WiMAX, LTE, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE may perform any of the embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

The UE 106 may be configured to recover uplink synchronization with the network 100 after a timing alignment failure, for example as further described subsequently herein.

Figure 3:
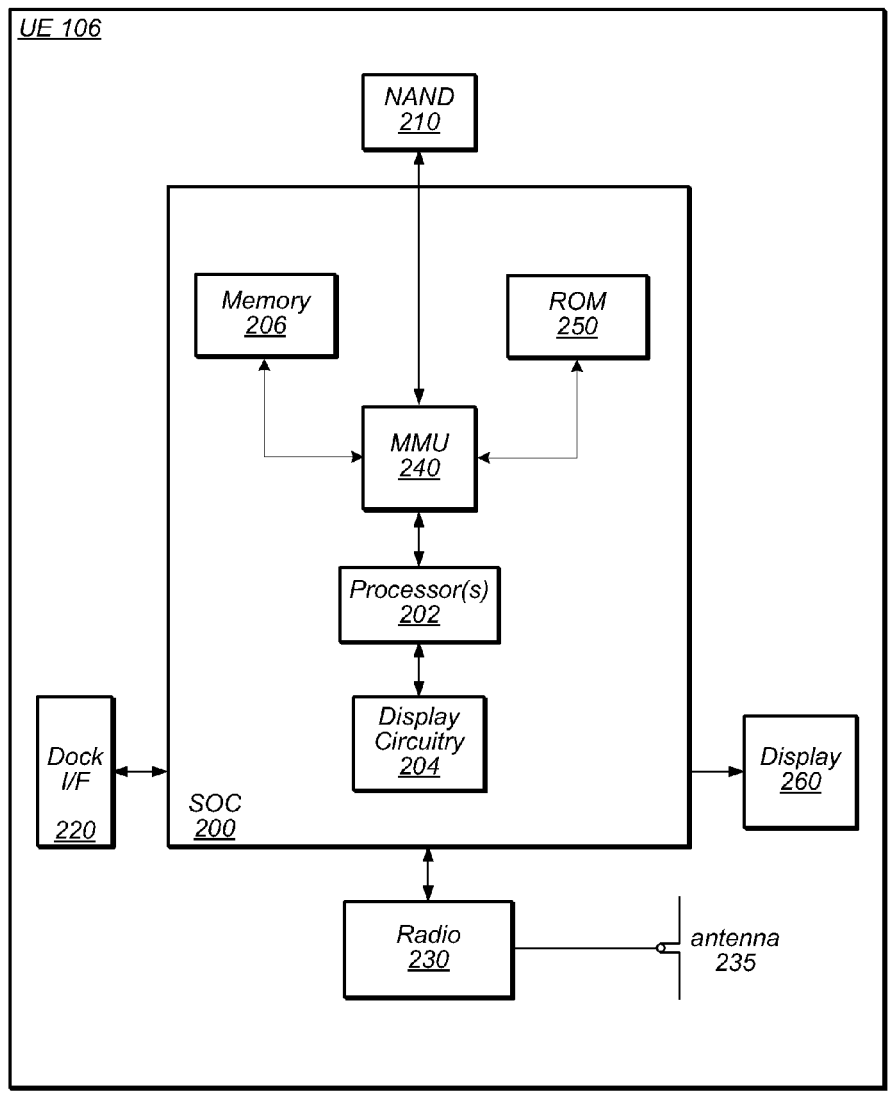
FIG. 3 is an example block diagram of a UE 106.

FIG. 3—Exemplary Block Diagram of a UE

FIG. 3 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 260. The MMU 240 may be configured to perform memory protection and page table translation or set up. In some embodiments, the MMU 240 may be included as a portion of the processor(s) 202.

As shown, the SOC 200 may be coupled to various other circuits of the UE 106. For example, the UE 106 may include various types of memory (e.g., including NAND flash 210), a connector interface 220 (e.g., for coupling to a computer system, dock, charging station, etc.), the display 260, and wireless communication circuitry 230 (e.g., for UMTS, LTE, CDMA2000, Wi-Fi, GPS, etc.).

The UE device 106 may include at least one antenna, and in some embodiments multiple antennas, for performing wireless communication with base stations and/or other devices. For example, the UE device 106 may use antenna 235 to perform the wireless communication. As noted above, the UE may be configured to communicate wirelessly using multiple wireless communication standards in some embodiments.

As described further subsequently herein, the UE 106 may include hardware and software components for implementing features for recovering uplink synchronization after a timing alignment failure, such as those described herein with reference to, inter alia, FIGS. 5-6. The processor 202 of the UE device 106 may be configured to implement part or all of the methods described herein, e.g., by executing program instructions stored on a memory medium (e.g., a non-transitory computer-readable memory medium). In other embodiments, processor 202 may be configured as a programmable hardware element, such as an FPGA (Field Programmable Gate Array), or as an ASIC (Application Specific Integrated Circuit). Alternatively (or in addition) the processor 202 of the UE device 106, in conjunction with one or more of the other components 200, 204, 206, 210, 220, 230, 235, 240, 250, 260 may be configured to implement part or all of the features described herein, such as the features described herein with reference to, inter alia, FIGS. 5-6.

Figure 4:
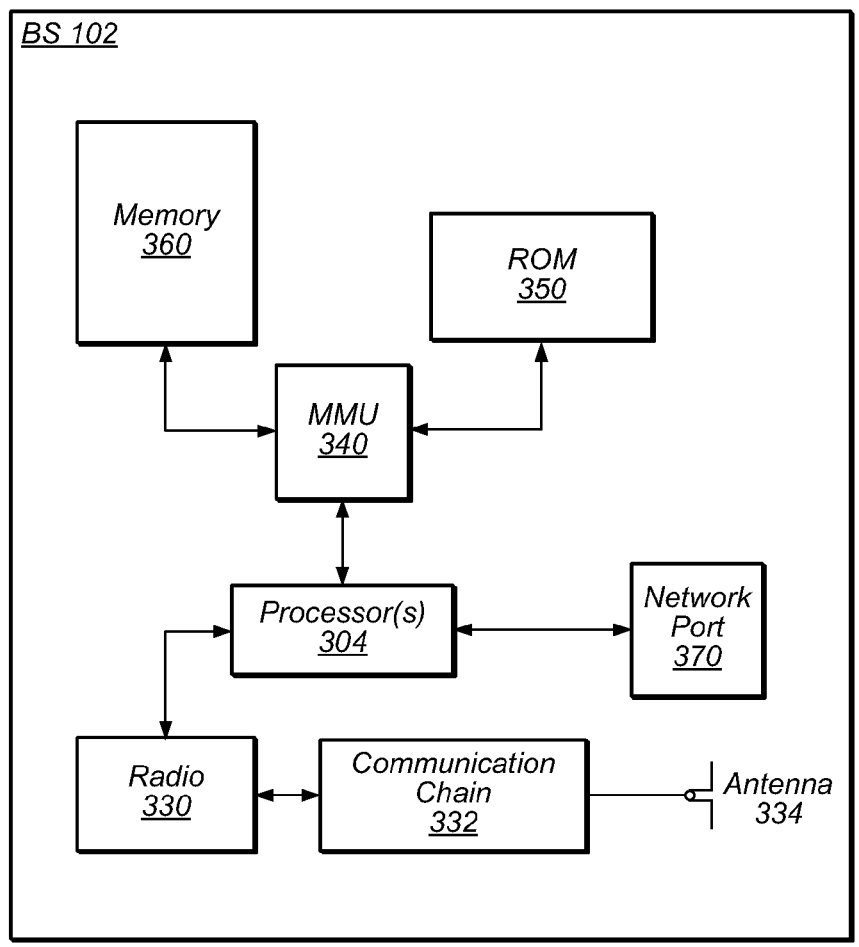
FIG. 4 is an example block diagram of a BS 102.

FIG. 4—Base Station

FIG. 4 illustrates an exemplary block diagram of a base station 102. It is noted that the base station of FIG. 4 is merely one example of a possible base station. As shown, the base station 102 may include processor(s) 304 which may execute program instructions for the base station 102. The processor(s) 102 may also be coupled to memory management unit (MMU) 340, which may be configured to receive addresses from the processor(s) 102 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless telecommunication standards, including, but not limited to, LTE, LTE-A, TD-SCDMA, WCDMA, CDMA2000, etc.

The processor 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

Figure 5:
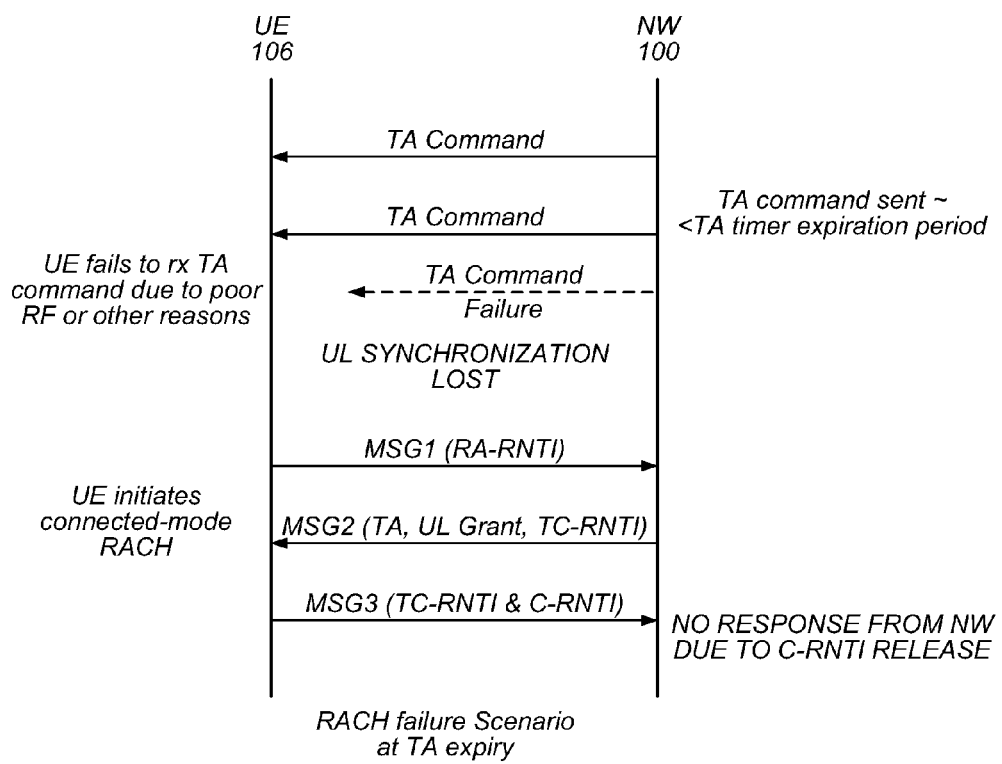
FIG. 5 is a communication diagram illustrating an exemplary timing alignment/uplink synchronization failure scenario.

FIG. 5—Timing Alignment Failure Scenario

FIG. 5 is a communication diagram illustrating an exemplary timing alignment failure scenario. In particular, the scenario illustrated in and described with respect to FIG. 5 relates to a timing alignment failure which occurs between a UE 106 and a network 100 in an exemplary LTE system. In other words, the UE 106 and the network 100 may communicate wirelessly according to the LTE cellular communication protocol (e.g., via one or more base stations or eNBs).

It should be noted that while numerous specific details of the exemplary set of embodiments of FIG. 5 are provided hereinbelow by way of example, it will be recognized by those of skill in the art that any number of variations on or alternatives to the specific details of the exemplary embodiments of FIG. 5 may be implemented if desired, and that accordingly the description provided with respect thereto should not be considered limiting to the disclosure as a whole.

In particular, it should be noted that alternative timing alignment failure scenarios and/or other instances of uplink synchronization loss may occur, either in alternate implementations of LTE (e.g., based on different cellular service provider and/or infrastructure manufacturer parameters, and/or based on updates to the LTE standard), or in other wireless communication protocols (e.g., cellular communication protocols, which may also be referred to as "radio access technologies" or "RATs") such as CDMA2000, UMTS, WiMAX, etc. In particular, aspects of the disclosure may be relevant in any of a variety of systems which utilize OFDM uplink communication channels and thus require uplink synchronization for effective operation of the system.

Timing synchronization or alignment may be an important feature for systems which utilize orthogonal frequency division multiplexing (OFDM) for shared communication channels. As one example, LTE may utilize SC-FDMA or DFT-OFDM-based uplink (UL) transmission for one or more of the physical uplink control channel (PUCCH) or the physical uplink shared channel (PUSCH). In such systems, signals transmitted from various entities (e.g., UE devices) utilizing the shared channel must arrive at their destination (e.g., a base station providing a serving cell to the UE devices) simultaneously or very nearly (substantially) so. Any significant amount of misalignment (e.g., more than a cyclic prefix) will disrupt the orthogonality of the signals and cause intra-cell interference. Accordingly, in such systems it is common to utilize a "timing advance" (or "TA") parameter in order to ensure that signals from each entity are received at the proper time. A device which has an updated TA and is appropriately configured to communicate with the cellular network may accordingly be considered "in-sync" with the cellular network. In cellular communication systems, this parameter may generally be determined by and transmitted from the base station 102 to the UE devices 106 on an individual basis (e.g., each UE 106 may receive a timing advance specific to that UE 106). As one example (e.g., in LTE), the value of the TA parameter might represent a number of timeslots, and might thus indicate to a UE 106 to perform uplink transmissions the indicated number of timeslots prior to their designated uplink timeslot (which may be designated according to an uplink grant received from the network).

Thus, after initially establishing a cellular wireless link with a cellular network (e.g., via a base station), a UE 106 may utilize an idle-mode random access procedure (RACH) in order to establish a connected-mode state with the cellular network. A RACH may be a contention-based procedure for acquiring synchronization and establishing communication channels and/or radio links which provide access to more extensive network resources (e.g., data carrying channels and/or greater uplink/downlink bandwidth). Note that there may be multiple types of RACH procedures; for example, in addition to the idle-mode RACH, which may be used for transitioning to connected-mode and acquiring synchronization, a connected-mode RACH may also be possible. The connected-mode RACH may be used for acquiring synchronization when already in connected-mode. Thus, which operation is used may generally depend on whether the UE 106 is operating in RRC_idle mode or RRC_connected mode.

As part of the idle-mode RACH, the UE 106 may identify itself to the cellular network (e.g., using a system architecture evolution temporary mobile subscriber identity (S-TMSI)) and receive an initial TA value. The UE 106 may also receive a cell radio network temporary identifier (C-RNTI) for identifying the UE to the cellular network while in the connected-mode state as part of establishing the connected-mode state. Once in the connected-mode state, the UE 106 may perform uplink data communications using the TA parameter.

Since UE devices 106 operating in a cellular communication system are generally mobile, the timing advance parameter for each UE 106 may gradually or rapidly change over time (e.g., based on distance from the UE 106 to the base station 102) in order to retain synchronization between the network 100 and a UE 106. Thus, even once a UE device 106 has received an initial timing advance, the UE 106 may expect or require timing advance updates every so often. For example, the UE 106 may utilize a timer (a "timeAlignment-Timer") to ensure that the TA parameter is up-to-date: the timeAlignmentTimer may be reset or restarted each time a TA update is successfully received by the UE, so if the timeAlignmentTimer expires, this may be an indication that no TA update has been received recently and that uplink synchronization may be lost. In other words, expiration of the TA may cause an out-of-sync condition between the UE 106 and the cellular network. In this case, the UE 106 may determine/declare that it is out-of-sync.

Thus, as shown in FIG. 5, though the UE 106 may initially have uplink timing synchronization, and this timing synchronization may be maintained as long as the UE 106 receives TA updates (or "TA commands") before the timeAlignment-Timer expires, at some point the UE 106 may fail to receive a TA command before the timeAlignmentTimer expires and uplink synchronization may be lost. The UE 106 may fail to receive a TA command before the timeAlignmentTimer expires as a result of poor RF conditions (e.g., particularly if the UE 106 is at the edge of the serving cell), or for any of a variety of other reasons. This may be more likely if, as may be the case in some networks and under some circumstances, the TA value may be updated only once every timeAlignment-Timer (e.g., when the UE is not moving very fast) in order to save network resources and UE power. Note that the value of timeAligmentTimer and the periodicity of transmission of TA commands generally depend on the implementation of the network infrastructure and/or configuration preferences of the network operator.

Once out-of-sync, the UE 106 may cease existing operations that relied upon uplink timing synchronization. For example, the UE 106 may flush all HARQ buffers, notify its RRC entity to release PUCCH/SRS, and clear any configured downlink assignments and uplink grants (e.g., as described in 3GPP 36.321, section 5.2).

At this point, in order to regain synchronization, the UE 106 may be required to utilize a random access procedure (RACH). If uplink synchronization is lost while in connected-mode, the UE 106 may attempt to perform a connected-mode RACH, as shown in FIG. 5. A connected-mode RACH generally includes a four message sequence between the UE 106 and the network 100. The first message ("Msg1") may be transmitted from the UE 106 to the network 100, and may include a RACH preamble, including a random access radio network temporary identifier (RA-RNTI). The second message ("Msg2", also referred to as "random access response" or "RAR") may be transmitted to the UE 106 from the network 100, and may include a timing advance (TA) parameter, a temporary cell radio network temporary identifier (TC-RNTI), and an uplink grant for transmitting the third message. The third message ("Msg3") may be transmitted from the UE 106 to the network 100, may be addressed using the TC-RNTI, and may include a cell radio network temporary identifier (C-RNTI) (e.g., which may have been assigned in an idle-mode RACH in order to transition to connected-mode). The fourth message ("Msg4") may be transmitted from the network 100 to the UE 106, and may be a message for early contention resolution, e.g., confirming that the RACH is successful.

The connected-mode RACH may be successful if the network 100 has continued to maintain the C-RNTI for the UE 106. However, it is quite possible that along with uplink synchronization loss, the network 100 may have released the UE 106 (which may include flushing the C-RNTI previously assigned to the UE 106 and which the UE 106 may have used in the connected-mode RACH). In this case, since the network 100 may not recognize the C-RNTI identified in the Msg3, the RACH may fail and no Msg4 may be forthcoming.

If this is the case, any subsequent connected-mode RACH attempts (which may continue to use the same stale/invalid C-RNTI to identify the UE 106 to the network 100) may also fail. This may in turn result in a radio link failure (RLF). Even after the RLF, if access stratum (AS) security has been activated before the RLF, the UE 106 may continue in connected-mode and thus perform further connected-mode RACH attempts during the RRC re-establishment procedure. It is possible that the UE 106 could continue with connected-mode RACH attempts until the T311 timer expires, after which the UE 106 may transition to RRC_idle mode.

Alternatively, the UE 106 may respond to timing alignment failure/uplink synchronization loss scenario such as illustrated in and described hereinabove with respect to FIG. 5 in a manner that takes into account the possibility that a failed connected-mode RACH attempt may be an indication that the UE 106 has been released by the network 100, and may use a different (e.g., idle-mode RACH) procedure for regaining uplink timing synchronization in such circumstances. FIG. 6 relates to one such technique for responding to timing alignment failure/uplink synchronization loss.

Figure 6:
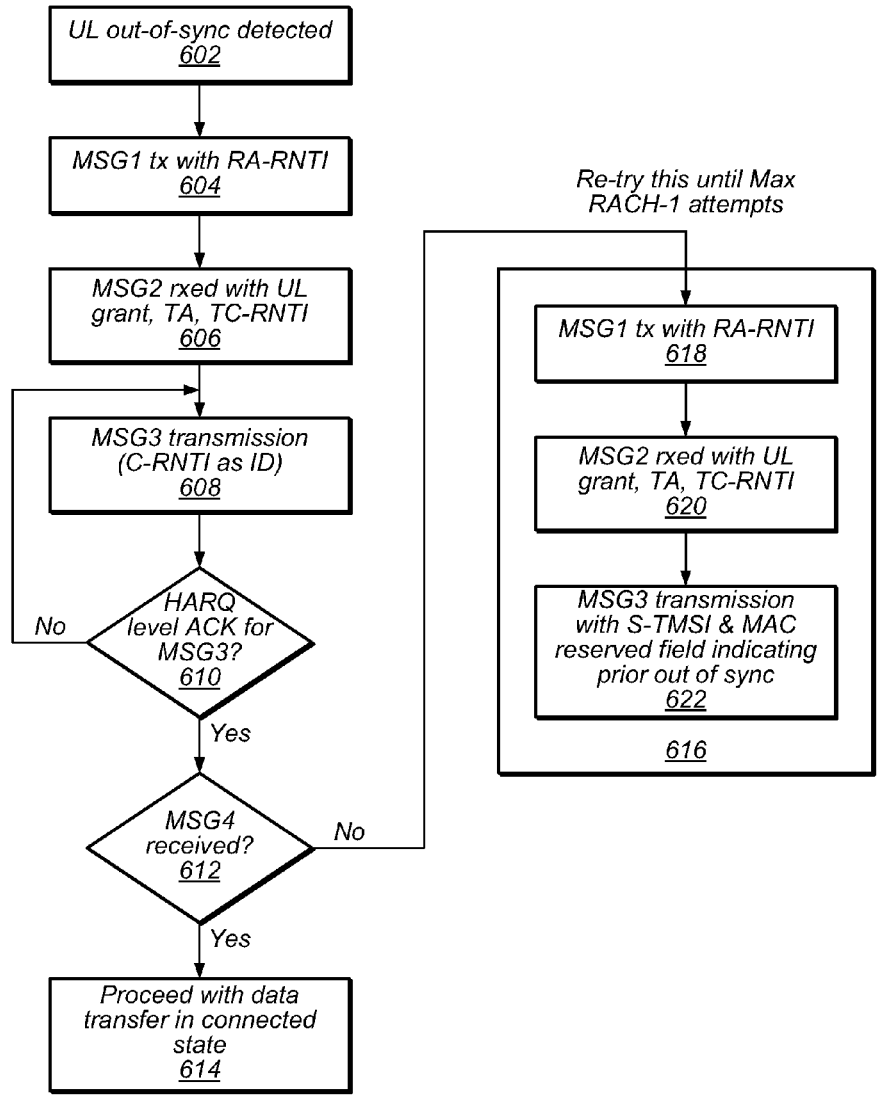
FIG. 6 is a flowchart diagram illustrating an exemplary method for regaining uplink synchronization.

FIG. 6—Uplink Synchronization Recovery

FIG. 6 is a flowchart diagram illustrating an exemplary method for uplink synchronization recovery, which may be performed by a UE device 106. In particular, the method illustrated in and described with respect to FIG. 6 continues to relate to the exemplary LTE system of FIG. 5.

Thus, similarly to FIG. 5, it should be noted that while numerous specific details of the exemplary set of embodiments of FIG. 6 are provided hereinbelow by way of example, it will be recognized by those of skill in the art that any number of variations on or alternatives to the specific details of the exemplary embodiments of FIG. 6 may be implemented if desired, and that accordingly the description provided with respect thereto should not be considered limiting to the disclosure as a whole.

In particular, it should be noted that alternative techniques falling within the scope of the disclosure may be used in alternate implementations of LTE (e.g., based on different cellular service provider and/or infrastructure manufacturer parameters, and/or based on updates to the LTE standard), or in other wireless communication protocols. For example, some or all of the details provided with respect to FIG. 6 may be relevant in any of a variety of systems which utilize OFDM uplink communication channels and thus require uplink synchronization for effective operation of the system.

The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, an uplink out-of-sync condition may be detected. The out-of-sync condition may be detected based on expiration of a timing alignment timer (e.g., timeAlignmentTimer, as described above). Since the UE 106 is out-of-sync, the UE 106 may initiate a RACH in order to attempt to regain uplink timing synchronization (e.g., in order to acquire a valid/recent/up-to-date timing advance parameter). The UE 106 may initially be in a connected-mode (e.g., RRC_connected mode), and so the RACH may be a connected-mode RACH.

Accordingly, in 604 the UE 106 may transmit a Msg1 (e.g., a RACH pre-amble with an RA-RNTI) to the network 100.

In 606, the UE 106 may receive a Msg2 (e.g., a random access response/RAR with an uplink grant, TA command, and TC-RNTI) from the network 100.

In 608, the UE 106 may transmit a Msg3 (e.g., having a C-RNTI which was established upon entering the connected-mode to identify the UE 106 to the network 100) to the network 100.

In 610, the UE 106 may determine whether the network 100 acknowledged receipt of the Msg3 from the UE 106. For example, the UE 106 may monitor the physical HARQ indication channel (PHICH) for ACK/NACK indications from the network 100 with respect to the Msg3. If no ACK/NACK is detected, or if a NACK is detected, the UE 106 may return to step 608 and re-transmit the Msg3 (or, if desired, back off and start the RACH procedure over with a new Msg1 at step 604).

If an ACK is detected for the Msg3, indicating that the network 100 has successfully received the Msg3, the UE 106 may determine whether a Msg4 is received in 612. If a Msg4 is received, in 614 the UE 106 may proceed to transmit any waiting (e.g., queued or buffered) uplink data to the network in a connected state, in a time-synchronized manner, e.g., based on the TA parameter received in the Msg2.

However, if a Msg4 is not received (e.g., within a certain amount of time) by the UE 106 despite confirmed reception of the Msg3 by the network 100, this may be an indication that the C-RNTI used by the UE 106 in the connected-mode RACH is no longer valid, e.g., because the network 100 may have released the UE 106. In this case, any further connected-mode RACHs would fail. Accordingly, the UE 106 may proceed to step 616, in which the UE 106 may initiate an idle-mode RACH attempt.

The idle-mode RACH attempt 616 may include similar transmissions as the connected-mode RACH attempt(s) for the Msg1 and the Msg2. Thus, in 618, the UE 106 may transmit a Msg1 (e.g., a RACH pre-amble with an RA-RNTI) to the network 100, then in 620, the UE 106 may receive a Msg2 (e.g., a random access response/RAR with an uplink grant, TA command, and TC-RNTI) from the network 100.

However, the Msg3 according to the idle-mode RACH may be different than the Msg3 according to the connected-mode RACH. In particular, instead of identifying the UE 106 to the network 100 using a C-RNTI, the UE 106 may transmit a system architecture evolution temporary mobile subscriber identity (S-TMSI) to identify the UE 106 to the network 100. Since the idle-mode RACH may not rely on the network 100 having maintained a C-RNTI which was previously assigned to the UE 106 and which may no longer be valid, the idle-mode RACH may have a greater likelihood of succeeding than the connected-mode RACH under the above-described circumstances.

In addition, note that in the exemplary scenario outlined hereinabove, it may also be advantageous to include an indication with the idle-mode RACH Msg3, that the idle-mode RACH is being performed as a result of an out-of-sync condition. For example, since the RACH procedure may typically be performed by the UE 106 at the media access control (MAC) protocol layer, it might be desirable to dedicate a MAC reserved field of the idle-mode Msg3 for indicating whether or not an out-of-sync condition has occurred (e.g., and is a cause for the idle-mode RACH). Other means of indicating that an idle-mode RACH is being attempted in response to an out-of-sync condition such as according to the hereinabove-described circumstances may be used alternatively or in addition, as desired. This may further facilitate re-establishment of uplink timing synchronization between the network 100 and the UE 106.

Thus, in 622, the UE 106 may transmit a Msg3 (e.g., having an S-TMSI to identify the UE 106 to the network 100, and possibly a MAC field or other indicator of an out-of-sync condition) to the network 100. If the Msg3 is successfully received by the network 100, the network 100 may provide the UE 106 with a Msg4, which may promote the TC-RNTI to the new C-RNTI (e.g., which can then be used for subsequent connected-mode RACH attempts, if necessary, such as if timing alignment is subsequently lost again). If there is a collision, or the network 100 otherwise fails to successfully receive the Msg3, the UE 106 may re-transmit the Msg3 and/or re-initiate the idle-mode RACH (e.g., starting with transmitting a new Msg1), e.g., up to a pre-determined maximum number of RACH attempts.

The method of FIG. 6 may represent a significant improvement in uplink timing synchronization recovery after a timing assignment failure relative to existing techniques. In particular, the method may provide a way to quickly (e.g., after few or even one failed connected-mode RACH attempts) determine that conditions indicating that the network 100 may have released the UE 106 exist. This may allow the UE 106 to instead utilize a procedure for re-establishing timing alignment which does not rely on the network 100 remaining in a connected state with respect to the UE 106 (e.g., an idle-mode RACH). In this way, the UE 106 may advantageously avoid numerous failed connected-mode RACH attempts and radio link failure which it might otherwise experience. This in turn may provide the user of the UE 106 with an improved experience, by reducing delays caused by the out-of-sync condition.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device configured to wirelessly communicate with a cellular network, comprising:
   a radio, comprising one or more antennas for performing wireless communication;
   a processing element operatively coupled to the radio;
   wherein the processing element and the radio are configured to:
      detect an out-of-sync condition with the cellular network;
      initiate a first type of random access procedure (RACH) in response to detecting the out-of-sync condition;
      determine whether or not a message transmitted as part of the first type of RACH is received by the cellular network;
      initiate a second type of RACH when the message transmitted as part of the first type of RACH is received by the network and no response to the message is received from the cellular network.

2. The UE of claim 1, wherein as part of the second type of RACH, the processing element is configured to:
   transmit a message comprising an indication that an out-of-sync condition occurred.

3. The UE of claim 2,
   wherein the indication that an out-of-sync condition occurred comprises an indication at a media access control (MAC) protocol layer.

4. The UE of claim 1,
   wherein both the first type of RACH and the second type of RACH are configured to provide uplink timing synchronization for the UE with the cellular network.

5. The UE of claim 1,
   wherein the first type of RACH is a connected-mode RACH, wherein the second type of RACH is an idle-mode RACH.

6. The UE of claim 1,
   wherein the UE is configured to communicate with the cellular network via an orthogonal frequency division multiplexing (OFDM) uplink communication channel when in-sync with the cellular network.

7. The UE of claim 1,
   wherein the RACH comprises a contention-based communication technique, wherein determining whether or not the message transmitted as part of the first type of RACH is received by the cellular network comprises determining whether or not an acknowledgement (ACK) or negative acknowledgment (NACK) of receipt of the message is received by the UE.

8. The UE of claim 1,
   wherein the UE is configured to communicate with the cellular network according to LTE.

9. The UE of claim 1,
   wherein a RACH comprises transmitting a first message to the cellular network, receiving a second message from the cellular network, transmitting a third message to the cellular network, and receiving a fourth message from the cellular network;
   wherein a third message according to the first type of RACH comprises a cell radio network temporary identifier (C-RNTI) configured to identify the UE, wherein a third message according to the second type of RACH comprises a system architecture evolution temporary mobile subscriber identity (S-TMSI) configured to identify the UE.

10. The UE of claim 1, wherein the processing element is further configured to:
    re-transmit the message transmitted as part of the first type of RACH when it is determined that the message is not received by the cellular network.

11. A non-transitory computer readable memory medium comprising program instructions for a wireless user equipment (UE) device to wirelessly communicate with a cellular network, wherein the program instructions are executable to:
    detect an out-of-sync condition with the cellular network with respect to an uplink communication channel;
    initiate a first random access procedure (RACH) of a first type in response to detecting the out-of-sync condition and based on having uplink data to transmit;
    determine whether or not a message transmitted as part of the first RACH of the first type is received by the cellular network;
    perform a second RACH of the first type when the message transmitted as part of the first RACH of the first type is not received by the cellular network;
    initiate a RACH of a second type when the message transmitted as part of the first RACH of the first type is received by the network and no response to the message transmitted as part of the first RACH of the first type is received from the cellular network;
    regain synchronization with the cellular network with respect to the uplink communication channel based on the first RACH of the first type, the second RACH of the first type, or the RACH of the second type, wherein regaining synchronization enables use of the uplink communication channel;
    transmit the uplink data using the uplink communication channel.

12. The memory medium of claim 11,
    wherein regaining synchronization comprises receiving a timing alignment parameter from the cellular network, wherein the timing alignment parameter is configured to align uplink transmissions from the UE with uplink transmissions from other UEs for substantially simultaneous reception by a base station.

13. The memory medium of claim 11,
wherein a RACH of the first type utilizes a first type of device identification information to identify the UE to the cellular network;
wherein a RACH of the second type utilizes a second type of device identification information to identify the UE to the cellular network.

14. The memory medium of claim 13, wherein the program instructions are further executable to:
determine if the message transmitted as part of the first RACH of the first type is received by the network and no response to the message transmitted as part of the first RACH of the first type is received from the cellular network, the first type of device identification information is not recognized by the cellular network;
initiate the RACH of the second type based on determining that the first type of device identification information is not recognized by the cellular network.

15. A method for operating a wireless user equipment (UE) device configured for cellular wireless communication, the method comprising:
performing uplink communications with a cellular network using an uplink channel shared by a plurality of cellular devices, wherein performing the uplink communications comprises utilizing a timing advance parameter to synchronize reception of the uplink communications by the cellular network with reception of uplink communications by the cellular network from other cellular devices of the plurality of cellular devices;
detecting that the timing advance parameter has expired, wherein expiration of the timing advance parameter causes an out-of-sync condition between the UE and the cellular network;
initiating a first type of random access procedure (RACH) based on the out-of-sync condition, wherein the first type of RACH utilizes first device identification information to identify the UE to the cellular network;
determining that the cellular network has flushed the first device identification information;
initiating a second type of RACH based on determining that the cellular network has flushed the first device identification information, wherein the second type of RACH utilizes second device identification information to identify the UE to the cellular network.

16. The method of claim 15, the method further comprising:
obtaining a new timing advance parameter via the second type of RACH;
performing uplink communications with the cellular network using the uplink channel utilizing the new timing advance parameter.

17. The method of claim 15, wherein determining that the cellular network has flushed the first device identification information based on the out-of-sync condition further comprises:
transmitting a message comprising the first device identification information to the cellular network;
initiating a timer based on transmitting the message comprising the first device identification information to the cellular network;
receiving an acknowledgement (ACK) indicating that the message comprising the first device identification information was received by the cellular network;
determining that the timer has expired, wherein no message responding to the message comprising the first device identification information is received by the UE prior to expiration of the timer.

18. The method of claim 15, the method further comprising:
transmitting a message comprising the first device identification information to the cellular network;
receiving an negative acknowledgement (NACK) indicating that the message comprising the first device identification information was not successfully decoded by the cellular network;
re-transmitting the message comprising the first device identification information to the cellular network in response to the NACK.

19. The method of claim 15,
wherein the first type of RACH comprises a radio resource control (RRC) connected-mode RACH, wherein the second type of RACH comprises an RRC idle-mode RACH.

20. A method for operating a wireless user equipment (UE) device, the method comprising:
receiving a timing advance parameter from a cellular network, wherein the timing advance parameter facilitates uplink synchronization between the UE and the cellular network;
initiating a timer based on receiving the timing advance parameter, wherein the timer is reset upon receiving updates to the timing advance parameter, wherein the UE loses uplink synchronization when the timer expires;
determining that the timer has expired;
initiating a connected-mode random access procedure (RACH) in response to determining that the timer has expired;
determining that the connected-mode RACH has failed in a manner not caused by failure to receive RACH messages from the UE to the network;
initiating an idle-mode RACH in response to determining that the connected-mode RACH has failed in a manner not caused by failure to receive RACH messages from the UE to the network.

21. The method of claim 20,
wherein the connected-mode RACH comprises transmitting a first message to the cellular network, receiving a second message from the cellular network, transmitting a third message to the cellular network, and receiving a fourth message from the cellular network;
wherein determining that the connected-mode RACH has failed in a manner not caused by failure to receive RACH messages from the UE to the network comprises determining that the third message according to the connected-mode RACH is received by the cellular network and determining that the fourth message according to the connected-mode RACH is not received by the UE.

22. The method of claim 21,
wherein the idle-mode RACH also comprises transmitting a first message to the cellular network, receiving a second message from the cellular network, transmitting a third message to the cellular network, and receiving a fourth message from the cellular network;
wherein the third message according to the idle-mode RACH comprises different information than the third message according to the connected-mode RACH.

23. The method of claim 22,
wherein the third message according to the connected-mode RACH comprises a cell radio network temporary identifier (C-RNTI) configured to identify the UE to the cellular network;
wherein the third message according to the idle-mode RACH comprises a system architecture evolution temporary mobile subscriber identity (S-TMSI) configured to identify the UE to the cellular network;

wherein the third message according to the idle-mode RACH further comprises an indication that uplink synchronization between the UE and the cellular network has been lost.

24. A wireless user equipment (UE) device configured to wirelessly communicate with a cellular network, comprising:
a radio, comprising one or more antennas for performing wireless communication;
a processing element operatively coupled to the radio;
wherein the processing element and the radio are configured to:
establish a cellular wireless link with a cellular network via a base station,
initiate an RRC_idle random access procedure (RACH), wherein the RRC_idle RACH utilizes a system architecture evolution temporary mobile subscriber identity (S-TMSI) to identify the UE to the cellular network,
wherein the RRC_idle RACH establishes an RRC_connected state with the cellular network, wherein establishing the RRC_connected state comprises receiving a timing advance (TA) parameter from the cellular network for synchronizing uplink data communications and a cell radio network temporary identifier (C-RNTI) for identifying the UE to the cellular network while in the RRC_connected state;
initiate a timer based on receiving the TA parameter, wherein the timer is reset upon receiving updates to the timing advance parameter, wherein the UE loses uplink synchronization when the timer expires;
perform uplink data communications while in the RRC_connected state using the TA parameter;
determine that the timer has expired;
initiate an RRC_connected RACH in response to determining that the timer has expired, wherein the RRC_connected RACH utilizes the C-RNTI to identify the UE to the cellular network;
determine that the cellular network has released the C-RNTI;
initiate an RRC_idle RACH in response to determining that the cellular network has released the C-RNTI, wherein the RRC_idle RACH utilizes the S-TMSI to identify the UE to the cellular network.

25. The UE of claim 24,
wherein a RACH comprises transmitting a first message to the cellular network, receiving a second message from the cellular network, transmitting a third message to the cellular network, and receiving a fourth message from the cellular network, wherein the third message according to an RRC_connected RACH comprises the C-RNTI, wherein the third message according to an RRC_idle RACH comprises the S-TMSI,
wherein the processing element and the radio are further configured to:
receive an acknowledgement (ACK) from the cellular network indicating that the third message of the RRC_connected RACH was received;
determine that no fourth message of the RRC_connected RACH has been received by the UE within a predetermined amount of time after transmission of the third message of the RRC_connected RACH;
determine that the cellular network has released the C-RNTI based on receiving the ACK from the cellular network indicating that the third message of the RRC_connected RACH was received and determining that that no fourth message of the RRC_connected RACH has been received by the UE within a predetermined amount of time after transmission of the third message of the RRC_connected RACH.

* * * * *